E. H. SEARLE.
BREECH LOADING FIREARM.
APPLICATION FILED JULY 22, 1918. RENEWED SEPT. 19, 1921.

1,395,455.

Patented Nov. 1, 1921.
5 SHEETS—SHEET 1.

Witness
Oscar V. Payne

Inventor
E. H. Searle
By Harvey S. Knight
Attorney

E. H. SEARLE.
BREECH LOADING FIREARM.
APPLICATION FILED JULY 22, 1918. RENEWED SEPT. 19, 1921.
1,395,455.  Patented Nov. 1, 1921.
5 SHEETS—SHEET 2.
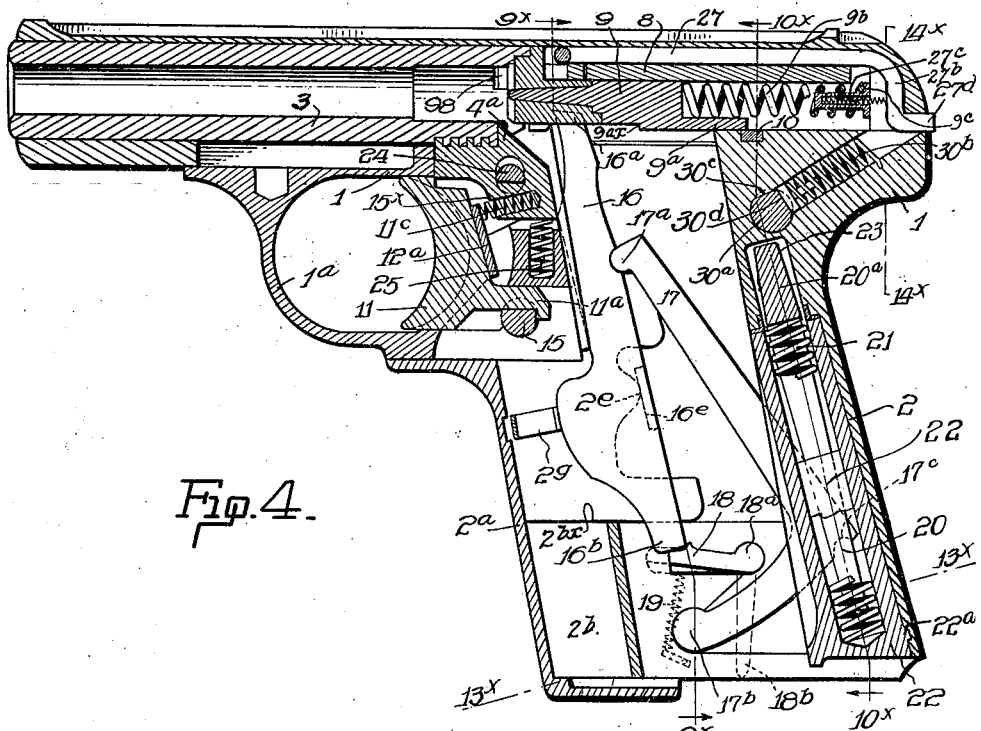
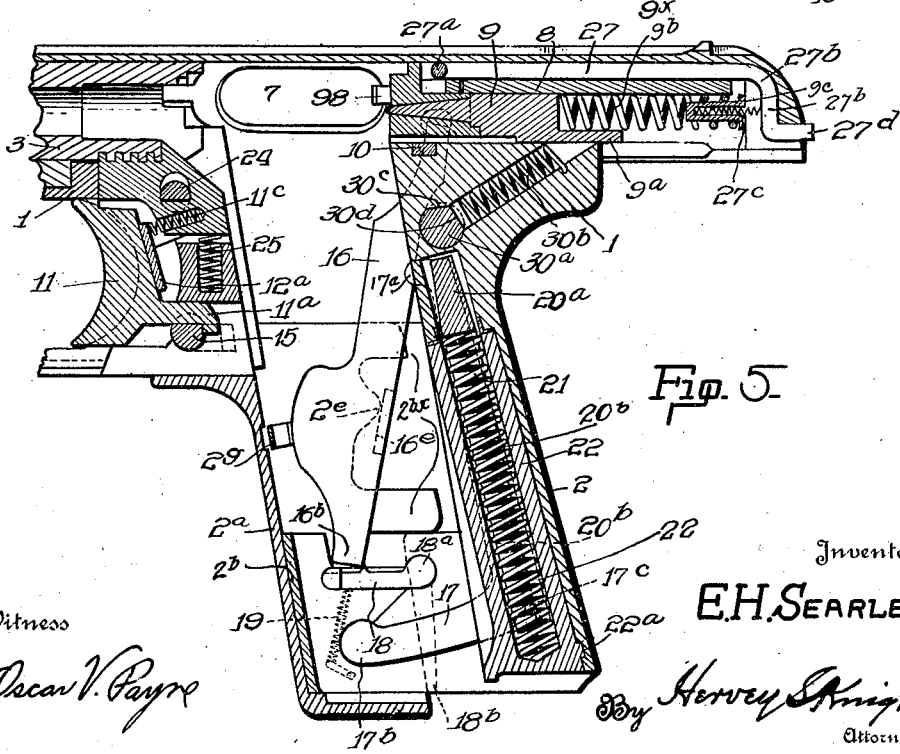
Witness
Oscar V. Payne
Inventor
E. H. Searle
By Hervey S. Knight
Attorney E. H. SEARLE.
BREECH LOADING FIREARM.
APPLICATION FILED JULY 22, 1918. RENEWED SEPT. 19, 1921.

1,395,455.

Patented Nov. 1, 1921.

Witness
Oscar V. Payne

Inventor
E. H. Searle
By Hervey S. Knight
Attorney

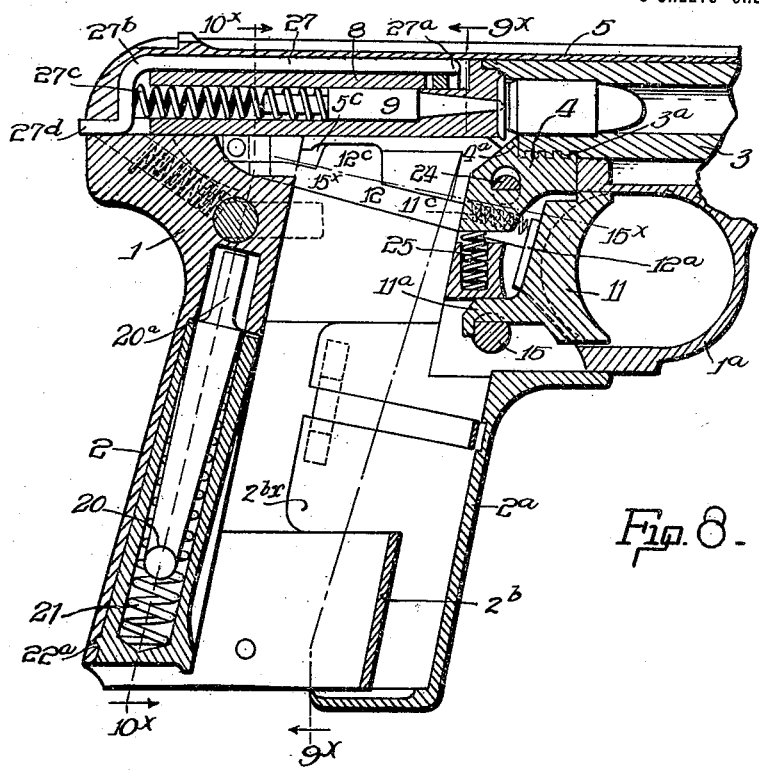

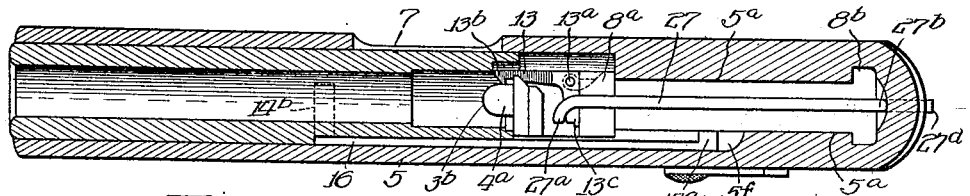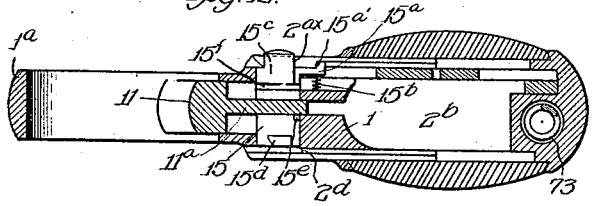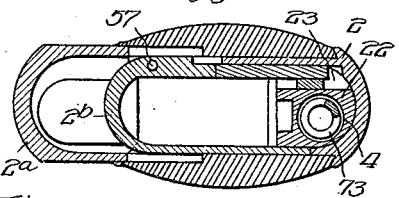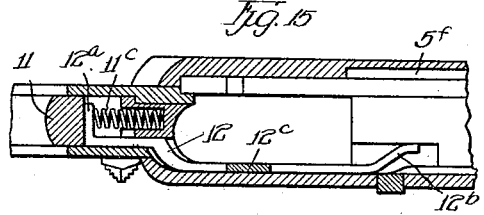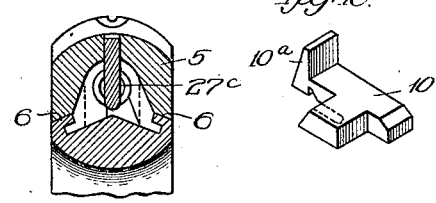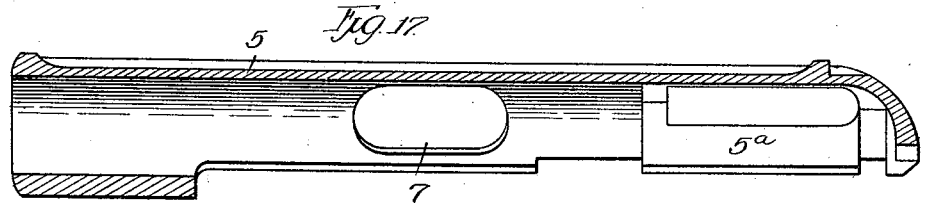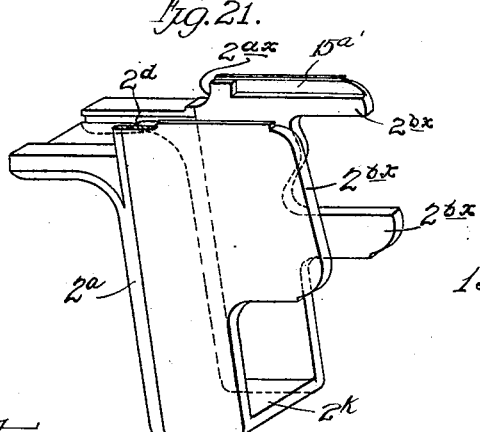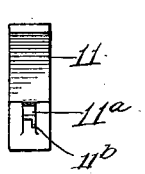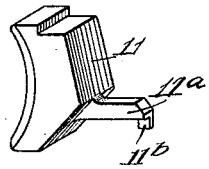

UNITED STATES PATENT OFFICE.

ELBERT H. SEARLE, OF GRIMES, CALIFORNIA.

BREECH-LOADING FIREARM.

1,395,455. Specification of Letters Patent. Patented Nov. 1, 1921.

Application filed July 22, 1918, Serial No. 245,981. Renewed September 19, 1921. Serial No. 501,827.

*To all whom it may concern:*

Be it known that I, ELBERT H. SEARLE, a citizen of the United States, residing at Grimes, in the county of Colusa and State of California, have invented certain new and useful Improvements in Breech-Loading Firearms, of which the following is a specification.

This invention relates to breech-loading fire-arms. Its several features of novelty are applicable to magazine fire-arms in general, but they will be here described, for purposes of illustration, as embodied in a semi-automatic or recoil actuated fire-arm designed as a pistol.

One object of the invention is to provide a fire-arm which may be carried with the chamber normally empty; that is to say, with the cartridges all in the magazine; but which may be manipulated to load and cock it ready for firing by the single hand with which it is to be held in firing, and by an action of the hand which is conveniently performed simultaneously with gripping the fire-arm and presenting it in position for firing. And to this end, certain features of the invention relate to a grip constructed of relatively movable members which may be made to approach each other by gripping, and then returned to normal position by means of a suitable spring, and which will, by these movements, perform the functions of loading and cocking the firearm; such features of the invention residing, as will be hereinafter fully pointed out, in the construction and assembly of the relatively movable members of the grip, certain lever mechanism interposed between them, whereby the functioning of the gun is accomplished, and the construction of a power spring by means of which return movements are imparted to the functioning members when the lever mechanism is released, and which preferably also imparts separating movements to the grip member when the gripping force is relieved.

Another object of the invention is to provide an improved construction and assembly of the several elements which go to make up the fire-arm, such as the mounting of the barrel upon the frame, and the construction and assembly of the firing mechanism, the extractor, the ejector, and the magazine, in which construction and assembly reside further features of the invention, as will be hereinafter fully pointed out.

In the accompanying drawings—

Figures 1, 2 and 3 represent a left side elevation, a front elevation, and a rear elevation of a fire-arm designed as a pistol, and in which the several features of my invention may be embodied;

Figs. 4, 5 and 6 are sections of the fire-arm taken in an approximately middle vertical longitudinal plane, with the magazine removed, and with the forward portion omitted in Figs. 5 and 6, but showing different positions of the parts; Fig. 4 showing the normal position of the parts, with the chamber empty; Fig. 5 showing the positions of the loading mechanism at the end of the movement which results from pressing the two members of the grip toward each other; and Fig. 6 showing the positions of the loading parts while the pressure upon the grip is still maintained after the actuating levers have been released and permitted to drive forward to close the breech and leave the striker cocked;

Fig. 8 is a view similar to Fig. 4 but reversed in position, and showing the next stage after that represented in Fig. 7, namely, after delivery of the firing stroke of the striker but before the parts have recoiled to reload; and showing the firing spring serving also for the extractor drawrod and certain of the operating parts removed by the section of Figs. 4 to 7;

Figure 6:
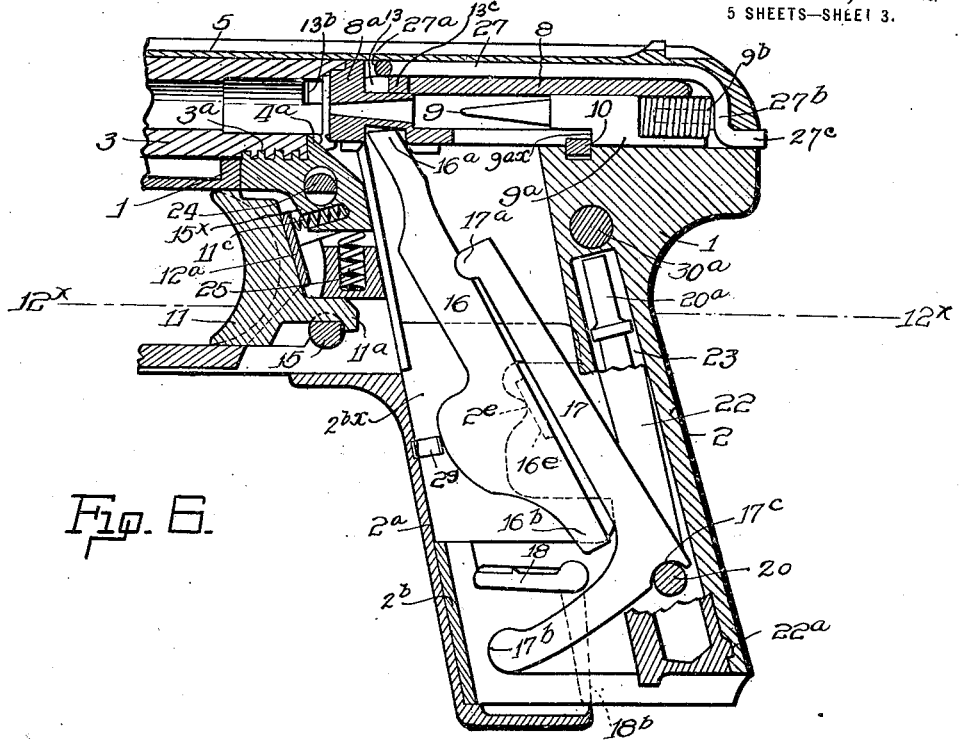
Figure 7:
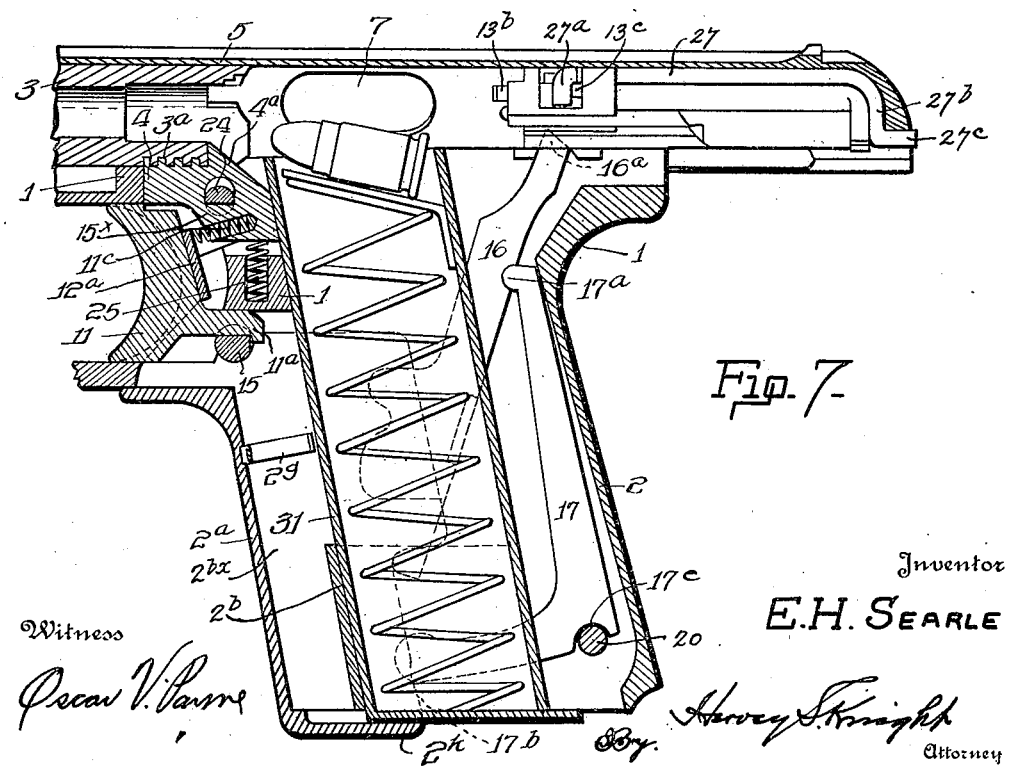
Fig. 7 is a view similar to Fig. 5, except that the parts are in position to which they are moved by the reaction of firing and the magazine is in place; further, the plane of section of the lower rear portion of the grip is changed to the right in order to disclose the mounting of the main loading lever.

Figs. 9 and 10 are vertical transverse sections, taken, respectively, on the lines 9×—9× and 10×—10× of Figs. 4, 8 and 15;

Fig. 11 is a section in about the horizontal plane of the bore and disclosing the extractor and ejector in their relation to the barrel and the breech-closing element therefor;

Fig. 12 is a horizontal section on the line 12×—12× of Figs. 6 and 10;

Fig. 13 is a horizontal section on the line 13×—13× of Figs. 4 and 9;

Fig. 14 is a section on the line 14×—14× of Fig. 4;

Fig. 15 is a horizontal section in the upper plane of the connector between the trigger and the sear on the line 15×—15× of Figs. 8 and 10;

Fig. 16 is a perspective view of the sear;

Fig. 17 is a vertical axial section of the breech-slide;

Fig. 18 is a perspective view of the trigger;

Fig. 19 is a rear view of the trigger;

Fig. 20 is a rear view of the assembly bolt that limits the movements of the movable grip member and the trigger; and Fig. 21 is a perspective view of the front or movable grip member.

1 represents the frame; 2 the grip; 3 a barrel held against both rotary and longitudinal movement upon the frame by the locking block 4; 5 a breech-slide which extends the full length of the frame, and is mounted thereon to slide longitudinally relatively thereto, through means of the tongue and groove joints 6, and which is provided with the usual ejector opening 7; 8 the breech-closure removably inserted through the under side of the breech-slide but longitudinally fixed therein and carrying the striker 9; 10 the sear; 11 the trigger; 12 the trigger and sear connector; 13 the extractor; and 14 the ejector.

While each of these parts involves novelty in its construction and assembly in the firearm, so far as above described each enters into the organization for the same general purposes and in substantially the same functional relationship to the other parts as is common in fire-arms of this general type.

The grip 2 embodies in its construction a front member $2^a$ made relatively movable to its rear member by providing the latter with a portion $2^b$ of reduced thickness, over which the member $2^a$ may slide, and the former with slide cheeks $2^{bx}$ above the portion $2^b$ (compare, for instance Figs. 8 and 9). Front grip-slide or member $2^a$ is arrested at its normal forward limit by shoulder $2^{ax}$ engaging the outer end $15^c$ of a transversely displaceable assembly bolt 15. It is releasably held there so as to provide, with the rear portion, a firm substantial holding grip by means of projection $15^a$ on said bolt 15 (Fig. 12) which projection enters the path of a shoulder $15^{a\prime}$ provided by the recess in one of the slide cheeks $2^{bx}$ of the grip member $2^a$, and is held there by spring $15^b$. End $15^c$ of bolt 15 also serves as a finger button, and being located near the trigger 11, and therefore within convenient reach of one of the fingers when the pistol is being held, may be displaced inwardly out of the path of shoulder $15^{a\prime}$ when it is desired to compress the grip to transfer the initial load from the magazine to the chamber. The bolt 15 also has at its opposite end a stop lug $15^d$ which, when the bolt is pressed inwardly in opposition to spring $15^b$, enters the path of the shoulder $2^d$ on the grip member $2^a$, and thus limits the forward movement of the grip member in case it should not be held at such time. Lug $15^d$ receiving shoulder $2^d$ admits the grip member $2^a$ to a more forward position than it normally assumes when shoulder $2^{ax}$ coacts with outer end $15^c$. This is for the purpose of permitting the magazine supporting ledge $2^k$ to move forwardly a sufficient distance to release the magazine, as hereinafter described. The grip member $2^a$ may move rearwardly a distance sufficient to uncover the projection $15^a$, and does move such a distance normally in loading the firearm and also when it is desired to disassemble the parts; but the bolt 15 is normally prevented from moving outwardly under the action of its spring $15^b$, when so uncovered, by means of a horn $11^a$ which projects rearwardly from the trigger 11 and overlies the bolt 15 in the path of the shoulder $15^e$ thereon. Further than this, the horn $11^a$ interlocks with the bolt 15 in the direction of outward movement of the trigger, through the medium of a reduced lug $11^b$ on the under side of the horn $11^a$, and this interlock thus serves the purpose of holding the trigger in position.

For disassembling the parts, the grip-slide, or movable member $2^a$ of the grip, is pressed to its rearward limit to uncover the projection $15^d$ of the bolt 15, whereupon the bolt may be pressed inwardly a distance sufficient to bring a groove $15^f$ in the vertical plane of the lug $11^b$ on the horn $11^a$, so that the trigger can then be withdrawn from position, and the bolt 15 will then move outward under the action of its spring where it can be completely removed from position.

The function of the grip-slide $2^a$ is to impart rearward movement to a breech-controlling lever system, and thereby open the breech to admit a cartridge from the magazine upward into the path of the breech-closure. Return movement of the lever system and closing of the breech are imparted by a spring as soon as the grip-slide reaches its rearward limit and without waiting for release of the hand which holds it. This lever system comprises a transmitting lever 16 and a master lever 17. The transmitting lever 16 has its upper end $16^a$ constantly engaged with the breech-closure 8, and, therefore, is adapted to impart rearward and forward longitudinal movement to both said closure and the breech-slide which carries it, and has its lower end $16^b$ restrained by a displaceable fulcrum 18 pivoted at 18ª and pressed upward by spring 19 so long as the lever 16 is required to act in a rearward direction under the rearward pressure of the grip-slide, but is released from said fulcrum 18 as soon as the grip-slide reaches its rearward limit, so that said lever 16 may then fulcrum upon its bearing (spring 29 to be described) against the grip-slide and be thrown forward under the action of the master lever 17. The master lever 17 has a constant bearing 17ª against the lever 16, has a fixed fulcrum 17ᵇ upon a suitable portion of the frame, and has a bearing 17ᶜ upon a stirrup 20 depending from the upper end of the main spring 21.

The lever 17 has two arms at an angle to each other so as to provide an approximately vertical arm through the end 17ª of which it controls the transmitting lever 16, an approximately horizontal arm through the end 17ᵇ of which it is fulcrumed, and an elbow 17ᶜ at the junction of the two arms, through which it receives the stirrup 20; and so that it is adapted to translate vertical action of the spring into an upwardly forward movement at the point of its bearing upon the transmitting lever 16. Spring 21 is mounted in a support 22 which fits into a vertical socket 23 in the rear portion of the grip 2, and is held under initial compression by the upper end 20ª of the stirrup 20 which carries a core 20ᵇ entering the spring 21, and bears at its upper end at the top of the socket 23 or through its offset 22ᶜ against the wall of the socket 23. The support 22 is held in place by the shoulder 22ª which engages in a recess in the rear wall of the socket 23 and in which the shoulder is held under the action of the spring 21. In order to displace the fulcrum 18 from the lower end of the transmitting lever 16 when the latter has completed its rearward movement under the action of the grip-slide, said fulcrum has a depending rocker-arm 18ᵇ which lies in the path of the lower portion of the grip-slide as the latter reaches its rearward limit. The parts are so proportioned that after the bolt 15 has been pressed inwardly by the finger, and the grip-slide 2ª has been pressed rearwardly with its horn 2ᵉ resting against the lug 16ᶜ of the lever 16, the parts will first assume the position shown in Fig. 4 until the rocker-arm 18ᵇ is moved rearward sufficiently to trip the fulcrum 18 from the lower end 16ᵇ of lever 16, whereupon the lever 16 will rock at 16ᵉ upon the horn 2ᵉ as a fulcrum, forwardly under the action of the master lever 17 driven by spring 21, and the parts will assume the position shown in Fig. 6 with the breech closed. And since the upper end 16ª of the lever 16 will now act as a fulcrum against the closed breech mechanism, forward pressure of the master lever 17 seeks to return the grip-slide 2ª, and does so return it as soon as the grip is relieved, so that the parts then again reach the position of Fig. 4 from which the cycle of movements started. Upon reaching the position of Fig. 4, the bolt 15 (Fig. 12) snaps its projection 15ª into the recess of the grip-slide, and the grip then becomes a firm and rigid structure through which the pistol may be held in aiming and firing. Preferably the lever 17 is not relied upon to impart the entire return movement of the grip-slide 2ª; on the contrary, a subordinate spring 2ᵍ is employed for imparting the latter portion of the movement. This leaves the spring 2ᵍ alone to act in controlling the limited back and forth movement of the grip-slide, such as is employed for opening and closing the magazine opening.

*Mounting the barrel upon the frame.*

The barrel 3 fits snugly in the breech-slide 5 so as to be confined thereby in all transverse directions, and it thus becomes necessary merely to anchor the barrel upon the frame firmly against rotary and longitudinal displacement to secure a complete mounting. The barrel is first inserted in the breech-slide 5, and the latter is then slid rearwardly over the frame, with the tongue and groove 6 inter-engaged, until the ribs and grooves 3ª of the barrel come into registry with the locking-block 4 in the frame. Block 4 may be depressed by a cam shaft 24 in opposition to a spring 25, until the ribs thereon are retired from the path of the ribs 3ª of the barrel, rotation of the cam 24 being imparted by any convenient means, such, for instance, as the lever 24ª (Fig. 1), and after the ribs and grooves are thus in registry the block 4 is allowed to rise under the action of its spring, and the barrel will be secured. Block 4 not only secures the barrel 3 against longitudinal movement, but has the lug 4ª that enters a recess 3ᵇ in the rear end of the barrel (Fig. 11), and this firmly secures the barrel against rotation upon the frame. Lug 4ª conveniently serves as the slide or incline through which to guide the point of the cartridge into the chamber of the gun when it is being displaced from the upper end of the magazine by the closing of the breech.

*Breech-closure.*

The breech-closure is in the form of a block 8 inserted through the open under side of the breech-slide 5, while the latter is separated from the frame, and held therein, as suggested in Figs. 11 and 17, by means of the enlargements 8ª and 8ᵇ at the ends of the breech-closure and the thickened portions 5ª on the inner side walls of the breech-slide.

The sear.

The sear 10 embodies the peculiarity of having a substantially straight-line or sliding movement transverse to the axis of the striker which it detains so as to reduce to a minimum any tendency to release the striker by a shock or a jar. This movement is preferably laterally transverse to the axis of the breech-slide; that is to say, the sear is supported vertically and longitudinally of the gun and moves in a direction sufficiently near horizontal to render ineffective its inertia at times of either vertical or longitudinal jarring of the gun. As is shown in Figs. 10 and 16, it engages in front of a longitudinal extension $9^a$ on the under side of the striker by an end moving diagonally into engagement therewith, while the general direction of the sear in which it must move to release the striker is laterally and downwardly. By the rearward elongation of the projection $9^a$ the sear is held downward out of engaging position so long as the striker is forward of its cocked position, and the sear is thus maintained in readiness to snap up into arresting position whenever the striker is again moved rearwardly by the opening of the breech. It will also be seen that the end of the sear remote from the striker intersects the outer surface of the frame, and since the indicating end is designed to be flush with the surface when the sear is admitted to the recess $9^{ax}$ of the striker and the latter is cocked, but projects outwardly beyond the surface whenever the striker is in a position to hold the sear out of the recess $9^{ax}$, the outer end $10^a$ becomes an accurate and convenient indicator of the condition of the striker. Any suitable spring may be employed for normally pressing the sear 10 inwardly, as, for instance, the spring $10^b$ suggested in Fig. 9.

Sear safety.

Figure 1:
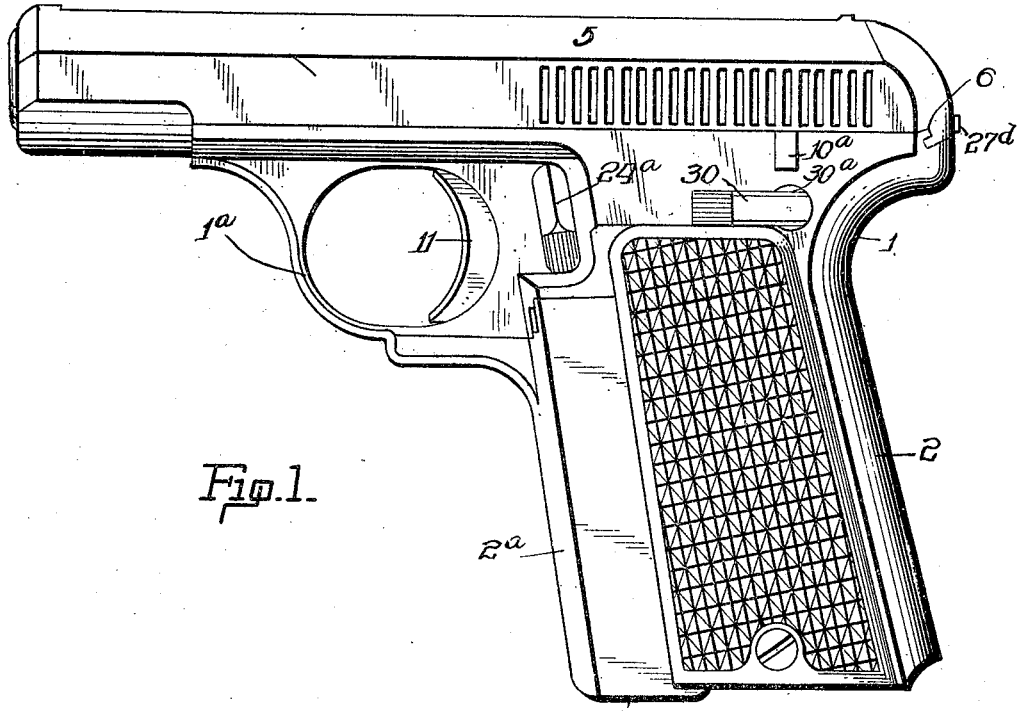
Figure 2:
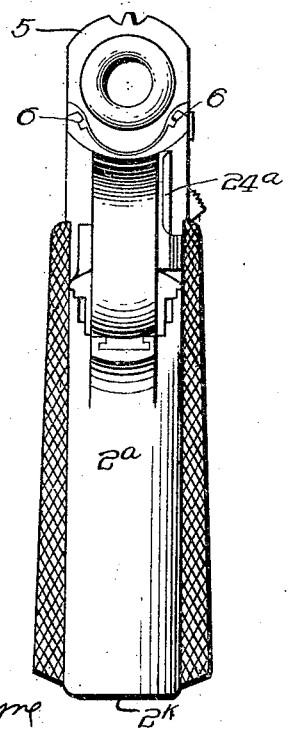
Figure 3:
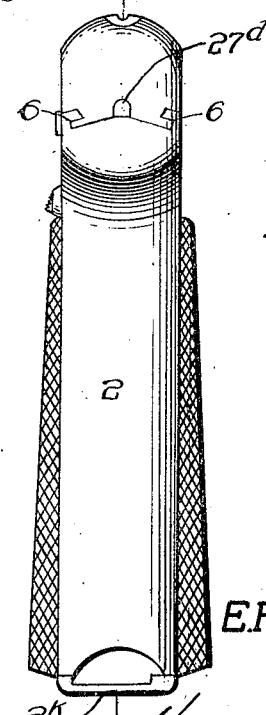

The protrusion of the end $10^a$ of the sear 10 incident to its disengagement from the striker serves the further purpose of locking the sear against such displacement, and thus rendering the fire-arm additionally safe when not in use. To accomplish this, a lever 30 mounted upon a rotary shaft $30^a$ and extending transversely of the frame, as shown in Figs. 1, 4 and 5, may be moved from the position shown in Fig. 1 to a position overlying the projecting end $10^a$, and when so adjusted, makes it impossible for the sear to move out of engagement with the striker. For the purpose of holding the lever 30 either in the position of Fig. 1 or in its sear-engaging position at substantially 90° thereto, a spring $30^b$ (Figs. 4 and 5) is introduced into the rear end of the frame in position to bear upon either of two flat faces $30^c$ or $30^d$ of said shaft, and so hold it releasably in either position to which it may be moved.

Trigger and sear connector.

The connector interposed between the trigger and sear is moved longitudinally of the fire-arm by the trigger action, and displaces the sear by a camming action. This circumstance, coupled with the transverse sliding movement of the sear, is of especial importance in safeguarding the fire-arm against accidental release of the trigger. The connector is indicated at 12. Its relation to the trigger 11 is best shown in Fig. 15, where it will be seen to have a transversely projecting end $12^a$ immediately behind the trigger and in position to receive the trigger spring $11^c$, while it terminates at the rear in a camming end $12^b$ through which it co-acts with the sear. Its control over the sear will be understood from Fig. 10, where it is shown passing through a notch in the under side of the outer end of the sear in such relation that as the connector moves rearwardly its cam face $12^b$ will force the sear outwardly and release the striker. The connector 12 has another movement, namely, a vertical movement by which it is caused to release the sear during the automatic action of the breech-slide, and so leave the sear ready to catch the striker and hold it in cocked position as the breech is closed. This displacing movement is imparted to a lug $12^c$ (Fig. 15) on the upper side of the connector 12, which lies normally in the vertical plane of the edge of the breech-slide, and is pressed downwardly thereby at all times, except when it coincides with the recess $5^c$, as shown in Fig. 8. That is to say, when the parts are in the position shown in Fig. 8 the connector 12 may rise up under the tipping action of the trigger spring $11^c$, for which effect the transverse projection $12^a$ is vertically elongated, as shown in Fig. 8, and so present its rear end in controlling relation to the sear. When the trigger is pulled and the fire-arm recoils, rearward movement of the breech-slide 5 passes the recess $5^c$ beyond the lug $12^c$ so that the under edge of the breech-slide cams down the connector 12 and so takes the rear end of the connector away from the sear and leaves the latter under control of its spring to engage in the recess $9^{ax}$ of the striker (see Fig. 6) as the latter reaches it in the return or closing movement of the breech mechanism, and so that the striker will be held back to cocked position while the remainder of the breech mechanism continues forward to the breech-closing position.

The extractor.

The extractor 13, as clearly shown in Fig. 11, is in the form of a bell-crank lever fulcrumed at 13ª with the usual end 13ᵇ in position to engage the neck of a cartridge, and having in this instance, arm 13ᶜ extending transversely of the breech-block 8, and in position to receive the forward hook end 27ª of a draw-rod 27 which lies longitudinally along the top of the breech-block, and has its rear end 27ᵇ dropped into alinement with a spring that imparts a rearward thrust to said draw-rod, and through it rocks the extractor 13 upon its pivot 13ª to cause it to engage the cartridge. According to the arrangement of Figs. 6 and 8, the spring 9ᵇ that actuates the striker 9 is utilized to also impart rearward thrust to the draw-rod 27, while according to Figs. 4 and 5 said striker spring 9ᵇ finds its rear abutment against a spring case 9ᶜ, which is sustained by a fixed abutment 5ᵏ on the breech slide, which spring case contains a smaller and more delicate spring 27ᶜ in position to play past the abutment 5ᵏ and develop rearward thrust against the draw-rod 27. This arrangement leaves the entire effective force of the striker spring 9ᵇ to control the striker, and utilizes the striker spring to hold the extractor spring in place.

A further feature of the draw-rod 27 is its rearward projection 27ᵈ presented at the rear end of the breech-slide in such manner that by its protrusion beyond or retirement into coincidence with the rear surface of the breech-slide it will indicate whether or not the extractor is displaced by the presence of a cartridge; in other words, will show whether or not the chamber of the fire-arm contains a cartridge.

The ejector.

The ejector in the present organization is mounted upon the barrel, and is assembled and disassembled with the barrel. To this end the ejector comprises a rearwardly extending rod 14 confined between the barrel 3 and the breech-slide 5, as shown in Fig. 11, with a shell-engaging shoulder 14ª at its rear end presented in the path of the shell as it is withdrawn by the extractor 13 and at the time the ejector opening 7 is brought into proper position; and this ejector is preferably provided with an arcuate clip 14ᵇ at its forward end seated in a correspondingly formed groove in the exterior surface of the barrel, and serving the purpose of fixing the ejector against longitudinal movement. In this aspect of the clip 14ᵇ it is merely a shoulder longitudinally interlocking with the barrel, and this is its prime function since it is naturally held against displacement from the barrel 3 wall of the breech-slide which surrounds it. But the clip 14ᵇ is preferably made to embrace more than a semi-circle of the barrel, so that it serves the additional function of holding the ejector to the barrel even when the latter is separated from the other parts and until it becomes necessary to remove or replace the ejector when the resilient nature of the clip permits this to be conveniently done.

Position index for non-rotary barrel.

The ejector 14 serves still another purpose, in that it enters a recess 5ᶠ in the breech-slide 5 when the barrel is introduced into the latter, and this determines the position of the barrel circumferentially within the breech-slide, and insures position of the interlocking ribs 3ª for registry with the locking-block 4, and greatly adds to the convenience of first assembling the barrel with the breech-slide and then sliding both of these parts longitudinally over the end of the frame and without the necessity of further manipulation of the barrel. The length of the groove 5ᶠ is, of course, sufficient to avoid interference with the reciprocating action of the breech-slide independently of the barrel, and it may also be utilized to limit the inward movement of the barrel in the breech-slide, and thus further assist in positioning the locking ribs of the barrel over those of its securing block in the frame.

The magazine.

The magazine is inserted vertically in the grip in an opening provided therein in a manner well known in the art, but to hold the magazine in place, the construction of the grip hereinbefore described, with the movable member 2ª or grip-slide, and the devices for controlling its positions, lends itself with peculiar advantage. So long as the grip-slide is in the position shown in Figs. 4 and 12, for instance, the magazine 31 is held by the lower ledge 2ᵏ of the grip-slide. But if the bolt 15 be pressed inwardly to release the projection 15ª from the grip-slide (see Fig. 12) and until the face 15ᵈ intercepts the shoulder 2ᵈ on the grip-slide, the grip-slide can move forwardly of the position shown in Figs. 4 and 12, and so release the magazine. The grip-slide is automatically moved to this position by the spring 2ᵍ, already described.

After the magazine has been replaced, it is merely necessary to press the grip-slide rearwardly with the bolt 15 released, when it will again move to the position of Fig. 4, and be caught therein by the projection 15ª, and the fire-arm will be ready for manipulation to introduce a cartridge into the chamber by first pressing the bolt 15 inward by the application of the finger to the button 15ᶜ, and then firmly pressing the members of the grip together until they reach their rearward limit which will cause the parts to function, as has already been described at length.

I claim:—

1. In a fire-arm, a reciprocating breech-closing member, a grip comprising relatively movable members, a lever mechanism against which said grip acts for retracting the breech-closing member, a fulcrum sustaining the lever at one point against the action of the grip, and means automatically releasing said fulcrum.

2. In a fire-arm, a reciprocating breech-closing member, a grip comprising relatively movable members, a lever mechanism against which said grip acts for retracting the breech-closing member, a fulcrum sustaining the lever at one point against the action of the grip, and means automatically releasing said fulcrum without releasing the lever mechanism from the grip.

3. In a fire-arm, a reciprocating breech-closing member, a grip comprising relatively movable members, a lever mechanism against which said grip acts for retracting the breech-closing member, a fulcrum sustaining the lever at one point against the action of the grip, and means automatically releasing said fulcrum; said last-named means being also controlled by the grip.

4. In a fire-arm, a reciprocating breech-closing member, an actuating lever imparting reciprocating movement thereto, a releasable fulcrum for said lever, and relatively movable grip members controlling said actuating lever and affording a rocking bearing therefor when its fulcrum is released.

5. In a fire-arm, a reciprocating breech-closing member, an actuating lever therefor, a spring imparting movement to the actuating lever in the breech-closing direction, a releasable fulcrum for said lever, and a grip comprising relatively movable members adapted to impart movement to the actuating lever in the breech-opening direction, and adapted to release said fulcrum.

6. In a fire-arm, a reciprocating breech-closing member, an actuating lever therefor, a grip controlling said lever, a spring imparting movement to the actuating lever in the breech-closing direction, a releasable fulcrum for said lever, and a grip for releasing said fulcrum and interrupting the control of the grip at the end of the opening movement and thereby permitting the breech to close under the action of the spring.

7. In a fire-arm, a reciprocating breech-closing member, a grip comprising relatively movable members, a lever mechanism encountered by the grip intermediate of the ends of the lever, for retracting the breech-closing member, and a fulcrum for said lever sustaining one portion of the lever against the action of the grip, and means automatically releasing said fulcrum.

8. In a fire-arm, a reciprocating breech-closing member, a grip comprising relatively movable members, a lever mechanism controlling the breech-closing member, and which is encountered intermediate of its ends by said grip for retracting the breech-closing member, said lever mechanism having a fulcrum controlling the end thereof remote from the breech closure, means automatically releasing the fulcrum at the end of the breech-opening movement, and a return spring acting upon the lever between the point of grip-control and the breech-closure.

9. In a fire-arm, a reciprocating breech-closing member, a grip, comprising relatively movable members, and a lever-mechanism controlled by said grip for retracting the breech-closing member, said lever-mechanism being interposed between and working forward and rearward in the vertical plane of the members of said grip and having its point of grip control intermediate its ends, with an automatically releasing fulcrum at its end remote from the breech closure, and a return spring acting upon it between the point of grip control and the breech closure.

10. In a fire-arm, a reciprocating breech-closing member, a grip, comprising relatively movable members, a lever-mechanism controlled by said grip, vertically disposed, and movable forwardly and rearwardly in the grip for reciprocating the breech-closing member and a vertically acting spring imparting the forward movement to the lever-mechanism said lever mechanism including a lever having two angularly disposed arms through one of which it is fulcrumed and through the other of which it transmits its work; and said spring acting upon said lever at the juncture of said arms.

11. In a fire-arm, a reciprocating breech-closing member, a grip comprising relatively movable members, a lever-mechanism controlled by said grip, vertically disposed and movable forwardly and rearwardly in the grip for reciprocating the breech-closing member and a vertically acting spring, imparting the forward movement to the lever mechanism said lever mechanism including a lever having an upwardly extending arm through which its work is transmitted, a forwardly extending arm through which it is fulcrumed, and an elbow through which it receives the vertically acting spring.

12. In a fire-arm, a reciprocating breech-closing member, a grip, and a lever mechanism through which the grip imparts reciprocating movement to the breech-closing member; said lever mechanism comprising a spring actuated power lever and a transmitting lever transferring movements from both the power lever and the grip to the breech-closing member.

13. In a fire-arm, a reciprocating breech-closing member, a grip, and a lever-mechanism through which the grip imparts reciprocating movement to the breech-closing member; said lever-mechanism comprising a spring actuated power lever and a transmitting lever transferring movements from both the power lever and the grip to the breech-closing member; said power lever comprising upwardly and forwardly extending arms bearing, respectively, against the transmitting lever and a fixed fulcrum, and receiving the spring action upwardly against the junction of its said arms.

14. In a fire-arm, a reciprocating breech-closing member, a grip, and a lever-mechanism through which the grip imparts reciprocating movement to the breech-closing member; said lever-mechanism comprising a spring-actuated power-lever and a transmitting lever controlled thereby and co-acting with the grip and with the breech-closing member; said power-lever being adapted to translate a vertical spring-action into a forward horizontal movement and said transmitting lever being vertically disposed in the grip and having a fulcrum releasable to permit its driving end to move forward under the action of the power lever, and said grip being adapted to release the fulcrum when the grip reaches the end of its movement.

15. In a fire-arm, a reciprocating breech-closing member, a grip, an actuating lever for controlling the breech-closing member and which is in turn controlled by said grip, spring-actuated means for imparting movement to said lever in the direction of closing the breech, a releasable fulcrum for said lever, and means in the path of the grip for releasing said fulcrum.

16. In a fire-arm, a breech-closing member, a transmitting lever for actuating said member, a grip-member adapted to move said transmitting lever in a direction for opening the breech, a fulcrum for said lever, means for releasing said fulcrum at the end of the opening movement and a power-lever acting upon the transmitting lever in the direction to close the breech, adapted to impart closing movement notwithstanding the release of said fulcrum and also exert a return movement upon the grip.

17. In a fire-arm, a breech-closing member, a power lever adapted to transmit closing movement to said breech-closing member, a vertically disposed spring for said power lever, and a stirrup having its upper end constructed to interengage with the upper end of the spring, hanging downwardly therefrom, and having its lower end constructed for interengagement with said lever to develop closing movement in the latter.

18. In a fire-arm a grip and a breech-closing member, a power lever adapted to transmit closing movement to said breech-closing member, a spring vertically disposed in said grip for actuating said power lever, and a stirrup having its upper end releasably interengaged with the upper end of the spring, hanging downwardly therefrom, and having its lower end engaged with said lever to develop closing movement in the latter; said stirrup being also releasably interengaged with the grip and holding said spring under initial tension.

19. In a fire-arm having a grip and a breech-closing member, a power lever adapted to transmit closing movement to said breech-closing member, a spring vertically disposed in the grip for controlling said lever, and a removable seat and mounting for said spring fitted in the grip; the spring having a bearing for its upper end sustained by the grip which places it under initial tension and holds the spring seat in the grip.

20. In a fire-arm having a grip and a breech-closing member, a power lever adapted to transmit closing movement to said breech-closing member, a spring vertically disposed in the grip for controlling said lever, and a removable seat and mounting for said spring fitted in the grip; the spring having a bearing for its upper end sustained by the grip which places it under initial tension; the spring seat and mounting being adapted to interlock with a wall of the grip and being held in its interlocked relation by the tension of said spring.

21. In a fire-arm having a grip and a breech-closing member, a power lever adapted to transmit closing movement to said breech-closing member, a spring vertically disposed in the grip for controlling said lever, a removable seat and mounting for said spring fitted in the grip, and a stirrup through which the spring controls the lever, having a portion interposed between the spring and the grip and holding the spring seat in the grip.

22. In a fire-arm having a reciprocating breech-closing member, a grip comprising fixed and movable members for manually functioning the fire-arm, and a magazine located between said members of the grip and held therein by said movable member while permitting relative movement of said members.

23. In a fire-arm having a reciprocating breech-closing member, a grip comprising relatively movable members for manually functioning the fire-arm, and a magazine located between said members of the grip and held therein by said members while permitting their relative movement; said magazine being released by a separation of the grip members beyond their normal limit of relative movement.

24. In a fire-arm having a reciprocating breech-closing member, a grip comprising relatively movable members for manually functioning the fire-arm, and a magazine located between said members of the grip, held therein by said members while permitting their relative movement and released by a separation of the grip members beyond their normal limit of relative movement, a releasable detent normally restricting the separating movement of the grip members within the limit of movement that releases the magazine.

25. In a fire-arm having a reciprocating breech-closing member, a grip comprising relatively movable members for manually functioning the fire-arm, and a magazine located between said members of the grip, held therein by said members while permitting their relative movement, and released by a separation of the grip members beyond their normal limit of relative movement, a releasable detent normally restricting the separating movement of the grip members within the limit of movement that releases the magazine; said detent also releasably engaging a grip member in the direction to resist the pressing of the grip members together.

26. In a fire-arm having a grip composed of members relatively movable for manually functioning the gun, a detent for said grip engaging the same in two positions, one of which limits separating movement of the grip members, while the other releasably resists movement of one of said members toward the other.

27. In a fire-arm having a grip composed of members relatively movable for functioning the gun, a detent normally resisting manual functioning movement of said members but releasable to permit said functioning movement; said members having an abnormal movement beyond their normal limit of functioning action, and said detent being rendered removable by said abnormal movement.

28. In a fire-arm having a grip composed of members moving relatively to manually function the fire-arm, a detent for said grip controlling the relative movement of its members and which is itself confined by a normal but rendered releasable by an abnormal position of the grip member, and a lug normally engaging said detent and resisting its removal when released by the grip movement.

29. In a fire-arm having a grip composed of members moving relatively to manually function the fire-arm, a detent for said grip controlling the relative movement of its members and which is itself normally restrained by a normal position but rendered releasable upon an abnormal movement of the grip member, and a trigger member normally engaging said detent and resisting its removal when released by the grip movement.

30. In a fire-arm having a grip composed of members moving relatively to manually function the fire-arm, a detent for said grip controlling the relative movement of its members and which is itself normally restrained by a normal position but rendered releasable upon an abnormal movement of the grip member, and a trigger member normally engaging said detent and resisting its removal when released by the grip movement; said trigger member and detent being normally interlocked to resist separation or removal of the trigger.

31. In a fire-arm having a grip composed of members moving relatively to manually function the fire-arm, a detent for said grip controlling the relative movement of its members and which is itself normally restrained by a normal position but rendered releasable upon an abnormal movement of the grip member, and a trigger member normally engaging said detent and resisting its removal when released by the grip movement; said trigger member and detent being normally interlocked to resist separation or removal of the trigger; and one of said parts having an abnormal movement to relieve said interlock and permit removal of the trigger and the detent in the order named.

Signed at Chicago, in the county of Cook, State of Illinois, this 6th day of July, A. D. 1918.

ELBERT H. SEARLE.

Witnesses:
HERVEY S. KNIGHT,
L. E. HANNEN.